United States Patent [19]

Schnell

[11] Patent Number: 4,787,826

[45] Date of Patent: Nov. 29, 1988

[54] PUMP, PARTICULARLY FOR HIGHLY VISCOUS MATERIALS

[75] Inventor: Karl Schnell, Winterbach, Fed. Rep. of Germany

[73] Assignee: Karl Schnell GmbH & Co. Maschinenfabrik, Winterbach, Fed. Rep. of Germany

[21] Appl. No.: 53,962

[22] Filed: May 22, 1987

[30] Foreign Application Priority Data

May 24, 1986 [DE] Fed. Rep. of Germany ....... 3617495

[51] Int. Cl.4 ............................................. F04B 23/14
[52] U.S. Cl. .................................. 417/203; 417/900;
    415/74; 418/70; 418/169; 418/270
[58] Field of Search ............... 418/169, 170, 70, 270;
    417/203, 900; 415/72, 74

[56] References Cited

U.S. PATENT DOCUMENTS

| | | | |
|---|---|---|---|
| 1,654,975 | 1/1928 | Kapuczin | 417/203 |
| 1,927,799 | 9/1933 | Mann | 417/203 |
| 2,042,641 | 6/1936 | Victoria | 415/74 |
| 2,055,587 | 9/1936 | Pigott | 417/203 |
| 2,378,998 | 6/1945 | Garancher et al. | 417/203 X |
| 2,705,835 | 4/1955 | Massmann | 417/203 X |
| 3,041,979 | 7/1962 | McLean et al. | 418/90 |
| 3,059,862 | 10/1962 | Rich | 417/203 X |
| 3,559,240 | 2/1971 | Kosinsky et al. | 415/74 |
| 3,708,249 | 1/1973 | Luthi | 417/203 |
| 4,558,985 | 12/1985 | Fischer et al. | 415/74 |

Primary Examiner—Carlton R. Croyle
Assistant Examiner—Theodore Olds
Attorney, Agent, or Firm—Horst M. Kasper

[57] ABSTRACT

A pump, particularly, for pasteous masses, includes a rotatable outer wheel provided with a plurality of inner teeth, a pinion rotatable inside the outer wheel eccentrically thereto and having a plurality of outer teeth, the outer wheel and the pinion forming an intermediate space therebetween, a pressure seqment located in the intermediate space between the outer wheel and the pinion, an inlet and an outlet which are offset relative one another in direction of rotation, and a filling device connected with the inlet, the filling device including a filling container and a feeding element arranged in the filling container and having a feeding direction so as to feed a mass toward the inlet.

34 Claims, 2 Drawing Sheets

PUMP, PARTICULARLY FOR HIGHLY VISCOUS MATERIALS

BACKGROUND OF THE INVENTION

The present invention relates to a pump, particularly for pasteous masses.

More particularly, it relates to a pump for pasteous masses, which has a pump housing, a drivable outer wheel provided with a plurality of inner teeth and rotatably supported in the housing, and a pinion which is rotatable by the outer wheel and provided with a plurality of outer teeth. The pinion is arranged eccentrically to the outer wheel and forms an intermediate space with the latter. A wedge-shaped, curved pressure segment is arranged in the intermediate space between an inlet and a peripherally offset outlet as considered in a direction of rotation.

The pumps of the above mentioned general type are known in the art and used in many cases for feeding pasteous masses. They have been extensively used in the meat processing industry, as well as in other branches of food production.

It has been recognized that such feeding pumps cannot aspirate each and every product to be fed. Particularly, some difficulties take place during feeding of pasteous masses which are frequently used in the meat processing industry.

SUMMARY OF THE INVENTION

Accordingly, it is an object of the present invention to provide a pump which is especially suitable for use for the above described specific application.

In keeping with these objects and with others which will become apparent hereinafter, one feature of the present invention resides, briefly stated, in a pump having an inwardly-toothed outer wheel, an outwardly toothed eccentrically rotating inner pinion, a pressure segment therebetween located in a rotary direction between the peripherally offset inlet and outlet, wherein a filling container is provided on an inlet opening of the pump and accommodates a feeding device having a feeding direction directed toward the inlet opening.

When the pump is designed in accordance with the present invention, the product to be pumped is introduced into the filling container. This can be performed manually or by means of a suitable charging device. A feeding device is arranged in the filling container and is designed so that it is suitable for feeding the product toward the inlet opening of the pump, so that the product reliably reaches the suction side of the pump and the pump is always completely filled. This is especially important when the pump is used in connection with a portioning of the pumped product.

It is known to supply the products to be fed into the intermediate spaces between the teeth of the pinion and the outer wheel in a peripheral direction, and press the product by means of the teeth of the pinion and the outer wheel from these intermediate spaces. The eccentricity of the pinion with respect to the geometrical axis of the outer wheel is selected so that its teeth in the region of the outlet opening engage in the tooth gaps of the outer wheel and vice versa.

In accordance with a further feature of the present invention, a stopper is arranged in the filling container for preventing the entrainment of the filled product or mass to be fed. When the feeding device includes a rotatable conveyor, this can lead to the fact that the pasteous mass is rotated in the container when the latter is designed in rotation-symmetrical manner. The stopper prevents this rotation or entrainment of the mass together with the rotatable feeding element. The stopper prevents the tendency of the mass to rotate and simultaneously achieves a thorough intermixing of the materials. Its shape is adjusted to the shape of the container, on the one hand, and to the shape of the feeding element of the feeding device, on the other hand.

In accordance with an especially advantageous embodiment of the present invention, the feeding device includes a driveable worm-gear or a similar element, whose movement region corresponds to the contour of the container or more particularly, to the contour of the associated part of the container. The feeding action is improved with the reduction of the distance of the worm-gear or similar element from the container wall in the respective region.

In a further embodiment of the invention, the driving shaft of the worm-gear or similar element is arranged centrally in the rotation-symmetrical container, and at least the lower container end which is associated with the pump housing is formed as a cone or a truncated cone. In this connection, in accordance with a further variant of the invention, the worm-gear or similar element is formed as a band-shaped element which is bent to form a conical spiral. In this case the stopper extends into the upper spiral end with a small play. This worm-gear or similar element can also be formed to be hollow and provided for reinforcement with a radial brace to the driving shaft. In any case, care should be taken to prevent colliding of the stopper with the above structure.

In a further embodiment of the invention, the stopper includes one or two arcuate or C-shaped stopper elements which are offset relative to one another by 180°. Their free leg ends extend from above into the spiral of the worm-gear or similar element. The shape and size of the stopper are selected so that on the one hand, a rotation of its free end through the upper spiral end is possible, and on the other hand, they are located as close as possible to the housing wall. The distance from the housing wall can be selected, however, to be substantially greater than the distance to the movement region of the inner worm-gear contour.

The novel features of the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
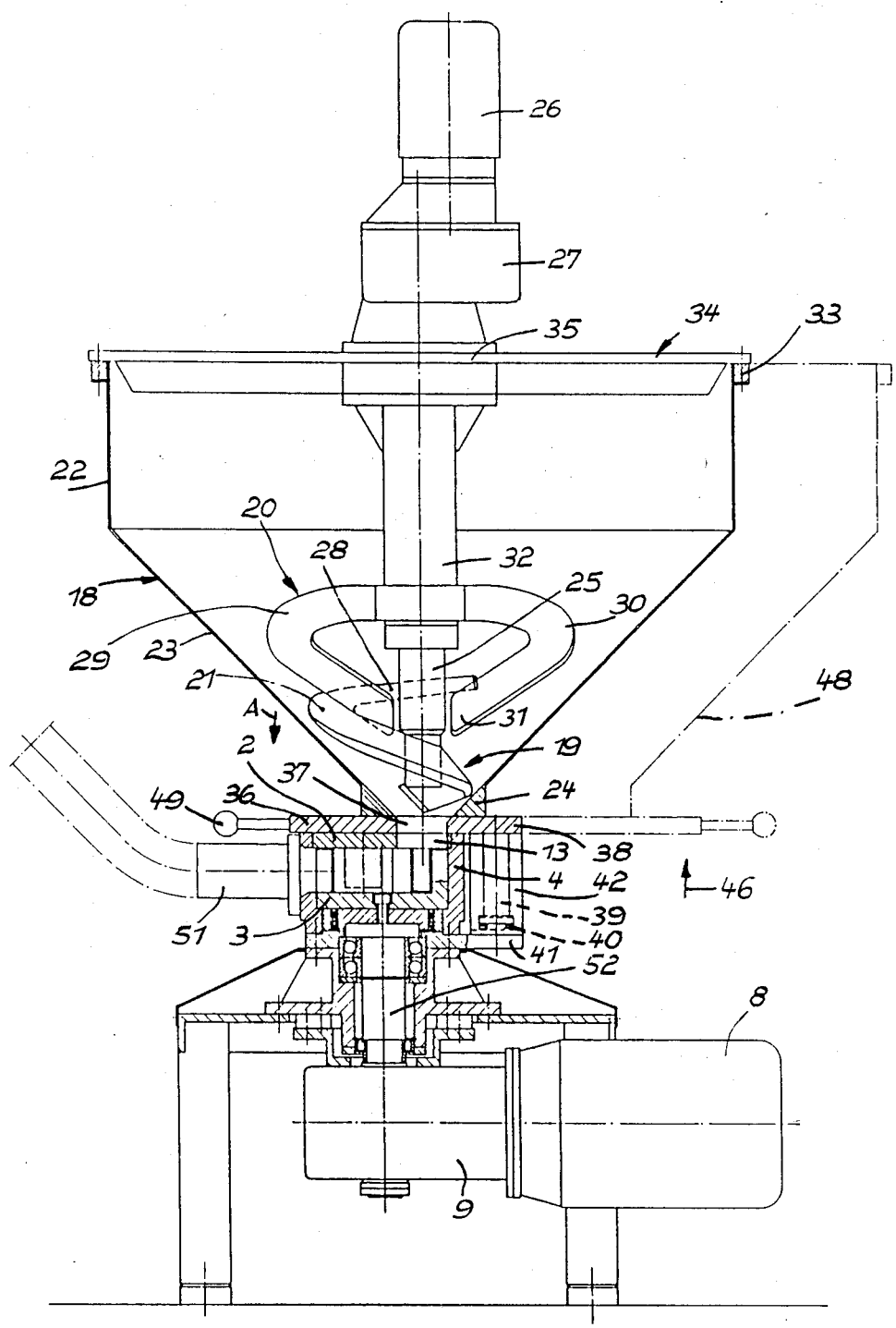
FIG. 1 is a view showing a vertical section of a pump, particularly for pasteous masses, in accordance with the present invention.

A pump, particularly for pasteous masses, in accordance with the present invention has a housing which is identified with reference numeral 1. The housing 1 has an upper plate-shaped housing wall 2, a parallel lower plate-shaped housing wall 3, and a tubular housing wall 4 which is arranged between the housing walls 2 and 3 or surrounds them. The housing walls together form a cylindrical inner chamber. An outer wheel 5 with inner teeth is arranged in the inner chamber and has a geometrical axis which coincides with the axis of the housing wall 4. A pinion 6 with outer teeth is rotatably supported on a bearing pin 7 and is eccentrical to the housing wall 4.

Figure 2:
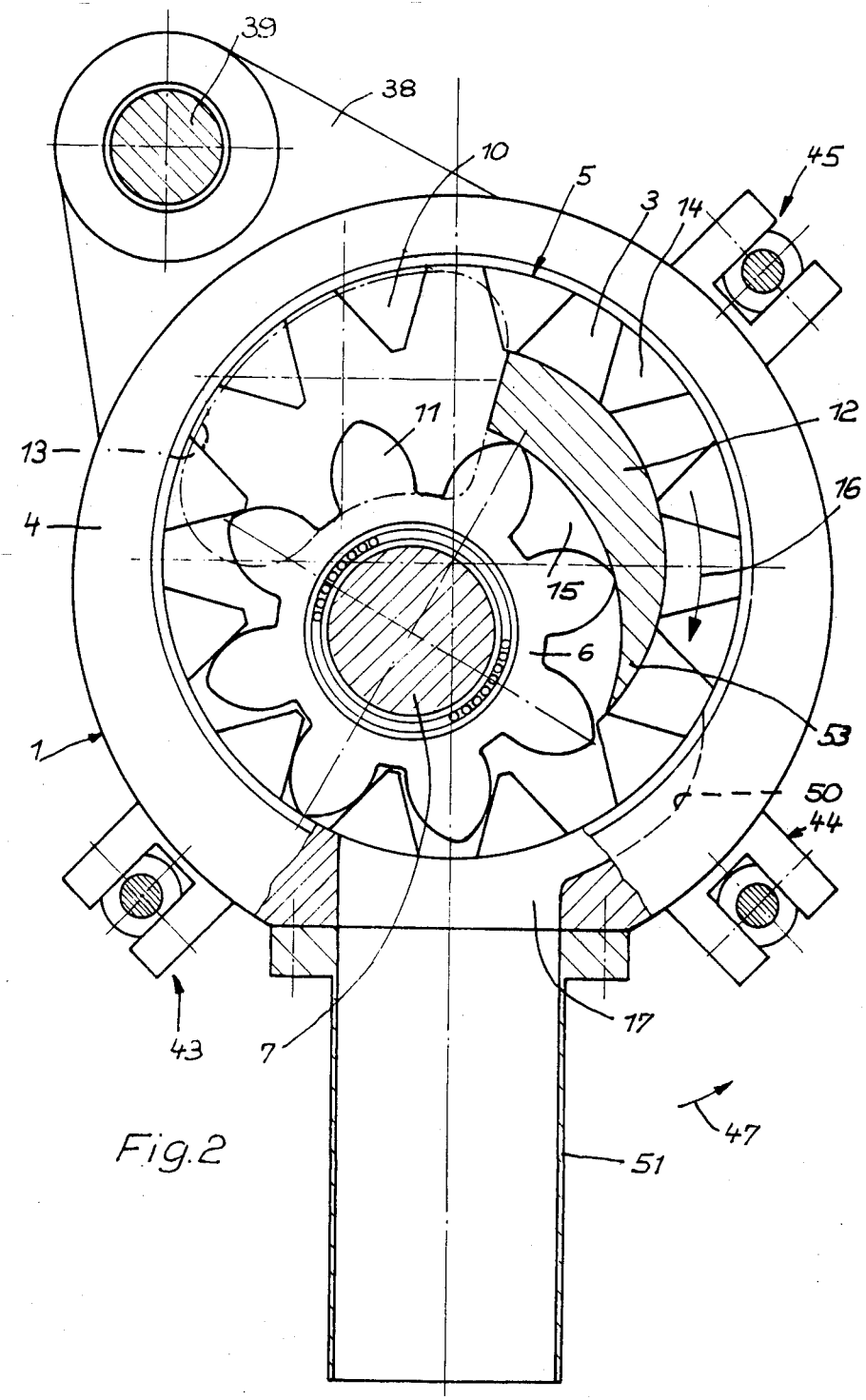
FIG. 2 is a plan view of the pump in accordance with the present invention, as seen in direction of the arrow A in FIG. 1, with a removed container and on an enlarged scale.

The pinion 6 is driven by the outer wheel 5. The drive is performed by an electrical motor 8 via a transmission 9. In an advantageous manner, the transmission is formed as a bevel-spur gear transmission. A half-moon-shaped intermediate space is formed between the teeth 10 of the outer wheel 5 and the teeth 11 of the pinion 6. A part of this intermediate space is filled with a pressure segment 12 which has the shape of a part of a moon or more exactly a moon sickle. An inlet opening 13 extends over the remaining part. The feeding medium is supplied through the inlet opening 13 and transported via tooth gaps 14 of the outer wheel 5 and tooth gaps 15 of the pinion 6 in a direction of the arrow 16 to an outlet opening 17. At this location the teeth 11 of the pinion 6 extend into the tooth gaps 14 of the outer wheel 5 and vice versa. As a result of this, the mass which is located in the tooth gaps is pressed out of them and transported to the outlet opening 17. From the above provided description it is clear that the length of the teeth, as measured in direction normal between the plane of FIG. 2, corresponds to the inner distance of the housing walls 2 and 3.

The inlet opening 13 of the pump or the pump housing 1 is provided with a filling container 18. The pump is formed as a lying pump, and therefore the filling container is located on the pump as shown in FIG. 1. A feeding device 19 is arranged in the filling container 18. Its feeding direction is directed toward the inlet opening 13 of the pump. A stopper 20 is also located in the filling container 18 for preventing the entrainment of the filled product. The feeding device 19 substantially includes a drivable worm-gear 21. The movement region or the radius of rotation of the worm-gear 21 corresponds to the contour of the container, particularly to the associated container part. As can be seen from FIG. 1, the container in the shown example has an upper cylindrical container part 22 and a lower conical or cone-shaped container part 23. In the shown example, it is produced from a metal sheet material and carries at its lower end a reinforcing ring 24.

The feeding worm-gear 21 has a driving shaft 25 which is arranged centrally in the container. The container is rotation-symmetrical with respect to the driving shaft 25. The driving shaft 25 is driven by means of an electric motor 26 with interposition of a transmission 27. The transmission is formed for example as a spur wheel transmission. The worm-gear 21 is designed as a band-shaped element which is bent to form a cone-shaped spiral. The stopper 20 extends into an upper spiral end 28 with a small play. This play amounts for example to several millimeters, so that the stopper also can serve to a certain degree as a stripper for the spiral.

The stopper 20 substantially includes at least one stopper element. Advantageously, as shown in the example, it includes two arcuate or C-shaped stopper elements 29 and 30 which are offset relative to one another by 180°. Free leg ends 31 of the stopper elements 29 and 30 extend from above into the worm-gear 21 or the upper spiral end 28.

A guiding bush 32 surrounds the driving shaft 25 of the worm-gear or the like. It supports the stopper or stoppers 20. Free ends 31 of the arcuate or C-shaped elements 29 and 30 extend toward the driving shaft 25.

A holder 34 for the drive 26, 27 of the feeding device 19 is provided on the container and more particularly on its rim 33. The holder 34 includes advantageously a free-arm bearing flange with a central holding element 35.

A support plate 36 for the filling container 18 is located upstream of the inlet opening 13 of the pump, as considered in the direction of passage of the material. It has a cutout 37 with a shape substantially corresponding to the shape of the underlying inlet opening 13 of the pump. The supporting plate 36 is provided with a side projection 38 which is comparable with the bearing block. It carries a bearing pin 39. As can be seen from FIG. 1, the lower end of the bearing 39 has an increased diameter. A spring or a spring set, for example a plate spring set, is located under the bearing pin and supported directly or indirectly on a stationary wall 41 under the pump housing 1. In the position of the bearing pin 39 shown in FIG. 1, the spring set 40 is pretensioned. The bearing 39 further extends through a housing-fixed bearing sleeve 42 which is connected with the wall 41. The geometrical axis of the bearing pin 39 extends parallel to the axis of the feeding device 19 or the driving shaft 25. Thereby it extends also perpendicularly to the plane of the supporting plate 36.

The supporting plate 36 is connected with the pump housing 1 by at least one fastener or as shown in the example, by three fasteners 43, 44, 45 which are offset relative to one another by 90°. The fasteners are of a conventional type and include for example an eye bolt with a washer and a nut. The lateral projection 38 is located in a gap between the outer fasteners 43 and 45. When these three fasteners are opened, the force of the spring set 40 is activated. It presses the supporting plate 36 in direction of the arrow 46 slightly upwardly, so that it comes to a position at a small distance from the upper housing wall 2. After this, the filling container 18 with all parts fixedly connected therewith can be turned, for example in direction of the arrow 47 in FIG. 2, about the bearing pin 39 as illustrated in a broken line 48. In this manner at least the inlet opening 13 and preferably also the entire pump can be released for cleaning. The container 18 can be turned by means of a handle 49 which preferably projects in a radial direction.

A pocket 50 is formed in the tubular housing wall 4. It merges into the radial outlet opening 17 of the pump. An outlet pipe 51 is connected with the outlet opening in the shown embodiment. As can be seen from FIG. 2, the pocket 50 is located in the region of a front end 53 of the pressure segment 12, as considered in the direction of rotation 16. It facilitates the emptying of the toothed gaps 14 and 15.

This feeding pump can be used generally for all applications where relatively pasteous masses must be pumped in a continuous stream to a consumer or a processing machine—such as a sausage-filling machine—which conventionally could not be aspirated at all or could be only insufficiently aspirated by known pumps of this type.

It will be understood that each of the elements described above, or two or more together, may also find a useful application in other types of constructions differing from the types described above.

While the invention has been illustrated and described as embodied in a pump, particularly for pasteous masses, it is not intended to be limited to the details shown, since various modifications and structural changes may be made without departing in any way from the spirit of the present invention.

The foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pump, particularly for pasteous masses, comprising
   a rotatable outer wheel provided with a plurality of inner teeth;
   a pinion rotatable inside the outer wheel eccentrically thereto and having a plurality of outer teeth engaging with said inner teeth, said outer wheel and said pinion forming an intermediate space therebetween;
   a pressure segment located in said intermediate space between said outer wheel and said pinion; and
   a rotatable drive shaft;
   filling means connected with said inlet, said filling means including
   a filling container having a conical container end associated with said inlet,
   movable feeding means including a worm gear attached to the drive shaft and arranged in said filling container and having a feeding direction so as to feed a mass toward said inlet;
   a guiding bush surrounding the rotatable drive shaft and fixed in position relative to the filling container and protruding into the filling container; and
   an immovable stopper attached to the guiding bush and extending in a radial direction from said guide bush arranged in said conical container end for preventing entraining of a mass to be filled, in the region of said conical container end.

2. A pump as defined in claim 1, and further comprising a pump housing, said outer wheel being rotatably supported on said pump housing and driven in rotation; and further comprising means for driving said outer wheel in rotation.

3. A pump as defined in claim 1, wherein said pressing segment which is located in said intermediate space between said outer wheel and said pinion is wedge-shaped.

4. A pump as defined in claim 1, wherein said container has a predetermined contour, said feeding means having a drivable feeding element with a movement region corresponding to the contour of said container.

5. A pump as defined in claim 4, wherein said container has a container part which is associated with said feeding element and has said predetermined contour, said movement region of said feeding element corresponding to said contour of said container part.

6. A pump as defined in claim 4, wherein said feeding element is formed as a driveable worm-gear.

7. A pump as defined in claim 1, wherein said container is rotation-symmetrical, said feeding means having a drivable feeding element provided with a driving shaft which is arranged centrally in said container.

8. A pump as defined in claim 7; and further comprising a pump housing on which said outer wheel is rotatably supported.

9. A pump as defined in claim 8, wherein said container end associated with said pump housing is formed as a truncated cone.

10. A pump as defined in claim 1, wherein said feeding means has a feeding element which is formed as a band-shaped worm-gear in form of a conical spiral.

11. A pump as defined in claim 10 wherein said conical spiral has an upper spiral end; said stopper extending into said upper spiral end with a small play.

12. A pump as defined in claim 11, wherein said stopper includes at least one stopper element which extends in an operative position from above into said worm-gear.

13. A pump as defined in claim 11, wherein said stopper includes at least two stopper elements which have free leg ends extending from above into said worm-gear.

14. A pump as defined in claim 13, wherein said stopper elements are formed as arcuate elements.

15. A pump as defined in claim 13, wherein said stopper elements are formed as C-shaped elements.

16. A pump as defined in claim 13, and further comprising a driving shaft for driving said worm-gear; and a guiding bush mounted on said driving shaft, said free leg ends of said stopper elements extending toward said driving shaft.

17. A pump as defined in claim 1, wherein said container has a container rim; and further comprising a drive for driving said feeding means; and a holder provided for said drive and arranged on said container rim.

18. A pump as defined in claim 17, wherein said holder is formed as a free-arm bearing flange arranged on said container rim.

19. A pump as defined in claim 17, wherein said drive for said feeding means includes an electric motor and a transmission therefor 20. A pump as defined in claim 1; and further comprising a housing having an upper housing wall, said inlet being formed as an inlet opening provided in said housing wall; and a supporting plate for said filling container arranged in an operative position of said pump above said housing and provided with a cutout which corresponds to said inlet opening.

21. A pump as defined in claim 20, wherein said upper housing wall is formed as a flat plate.

22. A pump as defined in claim 20, wherein said supporting plate extends in a predetermined plane and has a lateral projection with a bearing element, said feeding means having a driving shaft; and further comprising a bearing sleeve which surrounds said bearing element and has a geometrical axis which extends parallel to said driving shaft of said feeding means and perpendicular to said plane of said supporting plate.

23. A pump as defined in claim 22, wherein said bearing element is formed as a bearing pin which is fixedly attached to said housing.

24. A pump as defined in claim 20; and further comprising means for connecting said supporting plate with said housing and including at least one fastener, a transmission.

25. A pump as defined in claim 20; and further comprising means for connecting said supporting plate with said housing and including three fasteners which are offset relative to one another by 90°.

26. A pump as defined in claim 21; and further comprising at least one substantially radially projecting handle for turning said container relative to said housing.

27. A pump as defined in claim 21; and further comprising a pressing device for insignficant lifting said container relative to said housing in a condition when said fastener is released.

28. A pump as defined in claim 20, wherein said supporting plate has a bearing pin; and further comprising spring means arranged under said bearing pin and tensioned by said fastener.

29. A pump as defined in claim 28, wherein said spring means is formed as a spring.

30. A pump as defined in claim 28, wherein said spring means is formed as a spring set.

31. A pump as defined in claim 1; and further comprising a housing having a wall; and a bearing pin connected with said housing wall, said pinion which is driven by said outer wheel being rotatably arranged on said bearing pin.

32. A pump as defined in claim 1; and further comprising a housing which has a tubular housing wall with a pocket, said outlet being formed as a radial outlet opening in said housing, said pocket merging into said radial outlet opening of said housing.

33. A pump as defined in claim 32; and further comprising an outlet pipe connected with said outlet opening of said housing.

34. A pump as defined in claim 32, wherein said pressure segment has a front end as considered in direction of rotation of said outer wheel, said pocket being located in the region of said front end of said pressure segment.

* * * * *